US010415688B2

(12) United States Patent
Dillon

(10) Patent No.: US 10,415,688 B2
(45) Date of Patent: Sep. 17, 2019

(54) REMOTELY MOUNTED GEARBOX BREATHER FOR AN IRRIGATION MACHINE

(71) Applicant: Valmont Industries, Inc., Omaha, NE (US)

(72) Inventor: Cory J. Dillon, Bennington, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/163,786

(22) Filed: Oct. 18, 2018

(65) Prior Publication Data

US 2019/0120364 A1   Apr. 25, 2019

Related U.S. Application Data

(60) Provisional application No. 62/574,782, filed on Oct. 20, 2017.

(51) Int. Cl.
*F16H 57/02* (2012.01)
*A01G 25/09* (2006.01)
*F16K 24/04* (2006.01)
*F16H 57/027* (2012.01)

(52) U.S. Cl.
CPC .......... *F16H 57/027* (2013.01); *A01G 25/09* (2013.01); *F16K 24/04* (2013.01); *F16H 2057/02034* (2013.01); *F16H 2057/02056* (2013.01)

(58) Field of Classification Search
CPC ................. F16H 57/027; F16H 57/029; F16H 2057/02017; F16H 2057/02034; F16H 2057/02056; F16H 2063/005; A01G 25/09; A01G 25/16; F16K 24/04
See application file for complete search history.

(56) References Cited

U.S. PATENT DOCUMENTS

| 4,544,166 | A | * | 10/1985 | Karasawa | ................. | B60S 1/08 |
| | | | | | | 277/590 |
| 5,024,345 | A | * | 6/1991 | Deweerdt | ............. | F16H 57/027 |
| | | | | | | 138/89 |
| 5,062,447 | A | * | 11/1991 | Davison, Jr. | .......... | F16H 57/027 |
| | | | | | | 137/493 |
| 5,724,864 | A | | 3/1998 | Rodgers et al. | | |

(Continued)

FOREIGN PATENT DOCUMENTS

| GB | 2492476 A | 1/2013 |
| GB | 2492476 B | 10/2013 |

(Continued)

*Primary Examiner* — Adam D Rogers
(74) *Attorney, Agent, or Firm* — Milligan PC LLO

(57) ABSTRACT

The present invention provides a remotely mounted gearbox breather for an irrigation machine. According to a preferred embodiment, the system of the present invention may preferably include a gearbox having a gearbox fill port and a breather line which is attached at a first end to the gearbox at the gearbox fill port using a connection assembly and at a second end to the breather assembly. According to a further preferred embodiment, the connection assembly of the present invention may preferably include a first street elbow connected at a first side to the gearbox; a first pipe extension connected to the first elbow and a second elbow; and a hose barb connected to the first end of breather line.

7 Claims, 5 Drawing Sheets

(56) References Cited

U.S. PATENT DOCUMENTS

| | | | |
|---|---|---|---|
| 6,058,969 A * | 5/2000 | Bollwahn | F16H 57/027 137/583 |
| 6,820,822 B2 | 11/2004 | Daniels | |
| 6,840,137 B2 | 1/2005 | Kaplan et al. | |
| 6,843,747 B1 | 1/2005 | Phanco et al. | |
| 7,357,709 B2 * | 4/2008 | Zukor | F16K 24/04 454/270 |
| 7,604,020 B2 | 10/2009 | Kennedy | |
| 8,529,657 B2 * | 9/2013 | Kincaid | F16H 57/027 403/31 |
| 8,826,774 B1 | 9/2014 | Craig | |
| 8,944,091 B2 | 2/2015 | Sakraschinsky et al. | |
| 9,103,429 B2 * | 8/2015 | Wiens | F02M 37/0088 |
| 9,303,753 B2 | 4/2016 | Heyne et al. | |
| 9,650,926 B2 * | 5/2017 | Kistner | F16H 57/027 |
| 2008/0156374 A1 | 7/2008 | Nakano et al. | |
| 2011/0173935 A1 | 7/2011 | Tesner et al. | |
| 2017/0138461 A1 | 5/2017 | Chory et al. | |

FOREIGN PATENT DOCUMENTS

| | | |
|---|---|---|
| WO | 1988009422 A1 | 12/1988 |
| WO | 2011058571 A1 | 5/2011 |

* cited by examiner

REMOTELY MOUNTED GEARBOX BREATHER FOR AN IRRIGATION MACHINE

RELATED APPLICATIONS

The present invention claims priority to U.S. Provisional Application No. 62/574,782 filed Oct. 20, 2017.

BACKGROUND AND FIELD OF THE PRESENT INVENTION

Field of the Present Invention

The present invention relates generally to irrigation machines and, more particularly, to a remotely mounted gearbox breather for an irrigation machine.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linear and are fed with water from an outside source (i.e. well or water line). The essential function of an irrigation machine is to apply an applicant (i.e. water or other solution) to a given location.

In operation, the self-propelled towers of the irrigation machines are driven by drive motors attached to the wheels of each tower. To allow for the translation of torque from the drive motors to the wheels, drive motors usually include a gearbox. To function properly, it is important for the gearbox to maintain a steady internal pressure at all times. However, with the rough operating conditions experienced by wheel tower gearboxes, a steady internal pressure is difficult to maintain. This is due to the expansion and contraction of the lubricant (oil) and air within the gearbox due to temperature changes caused by normal seasonal changes, heat generated during gearbox operation and other environmental factors (e.g. barometric pressure changes solar radiation and the like). In addition, it is important that water, dirt and other contaminants be prevented from entering the gearbox as these could adversely affect the lubricant and gear meshing, resulting in damage or corrosion to the internal gearbox components. Currently available solutions have proven faulty and inadequate.

Previous attempts installed breathers directly into the fill port of the wheel gearbox, which caused oil leakage due to gearbox oil expansion as well as created an opportunity for dirt and water (mud) falling from the tire during movement of the irrigation tower to block the breather or even penetrate the breather barrier, allowing these contaminants to enter the gearbox. Other example solutions are shown in U.S. Publication No. US20080156374A1 which discloses a breather device which includes a valve mechanism for blocking the end of a breather path when water pressure of water flowing toward the breather path acts on the valve mechanism. Similarly, WO2011058571A1 discloses an air breather vent assembly for a mechanically enclosed environment which includes a single or double ball valve housed inside a central exhaust and intake chamber of body to allow for suction and exhaust of air. Further, U.S. Pat. No. 8,944,091 discloses a system for ventilation and aeration of a gear housing containing an oil filling and which has a line for connecting the gear housing to the atmosphere. U.S. Pat. No. 8,826,774 and U.S. Publication No. US20080156374A1 likewise show methods to relieve pressure within a gearbox.

For each system of the prior art, numerous limitations exist. In particular, each solution of the prior art allows for both oil leakage and water intrusion. In order to overcome the limitations of the prior art, a system is needed which is able to effectively provide ventilation for an irrigation system gearbox during irrigation operations.

SUMMARY OF THE DISCLOSURE

To minimize the limitations found in the prior art, and to minimize other limitations that will be apparent upon the reading of the specifications, the present invention provides a remotely mounted gearbox breather for an irrigation machine. According to an exemplary preferred embodiment, the present invention may preferably include a gearbox breather system for use with a mechanized system having at least one span and a drive tower having at least a first supporting leg and a second supporting leg.

According to a preferred embodiment, the system of the present invention may preferably include a gearbox having a gearbox fill port and a breather line which is attached at a first end to the gearbox at the gearbox fill port using a connection assembly and at a second end to the breather assembly. According to a further preferred embodiment, the connection assembly of the present invention may preferably include a first street elbow connected at a first side to the gearbox; a first pipe extension connected to the first elbow and a second elbow; and a hose barb connected to the first end of breather line.

According to a further preferred embodiment, the present invention may further include a breather assembly which includes an angle mount secured to the first supporting leg at a location remote from the area where mud and other debris are present, and a breather outlet secured to the angle mount by a breather connection assembly. According to a further preferred embodiment, the present invention may further include a breather connection assembly which includes a third elbow connected on a first side to the breather outlet, a fourth elbow connected to the third elbow; and a hose barb which is connected at a first end to the first surface of the angle mount and at a second end to the breather line.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized instead, these examples or illustrations are to be regarded as illustrative only. Those of ordinary skill in the art will appreciate that any term or terms with which these examples or illustrations are utilized will encompass other embodiments which or t be given therewith or elsewhere in the specification and all such embodiments are intended to be included within the scope of that term or terms.

Figure 1:
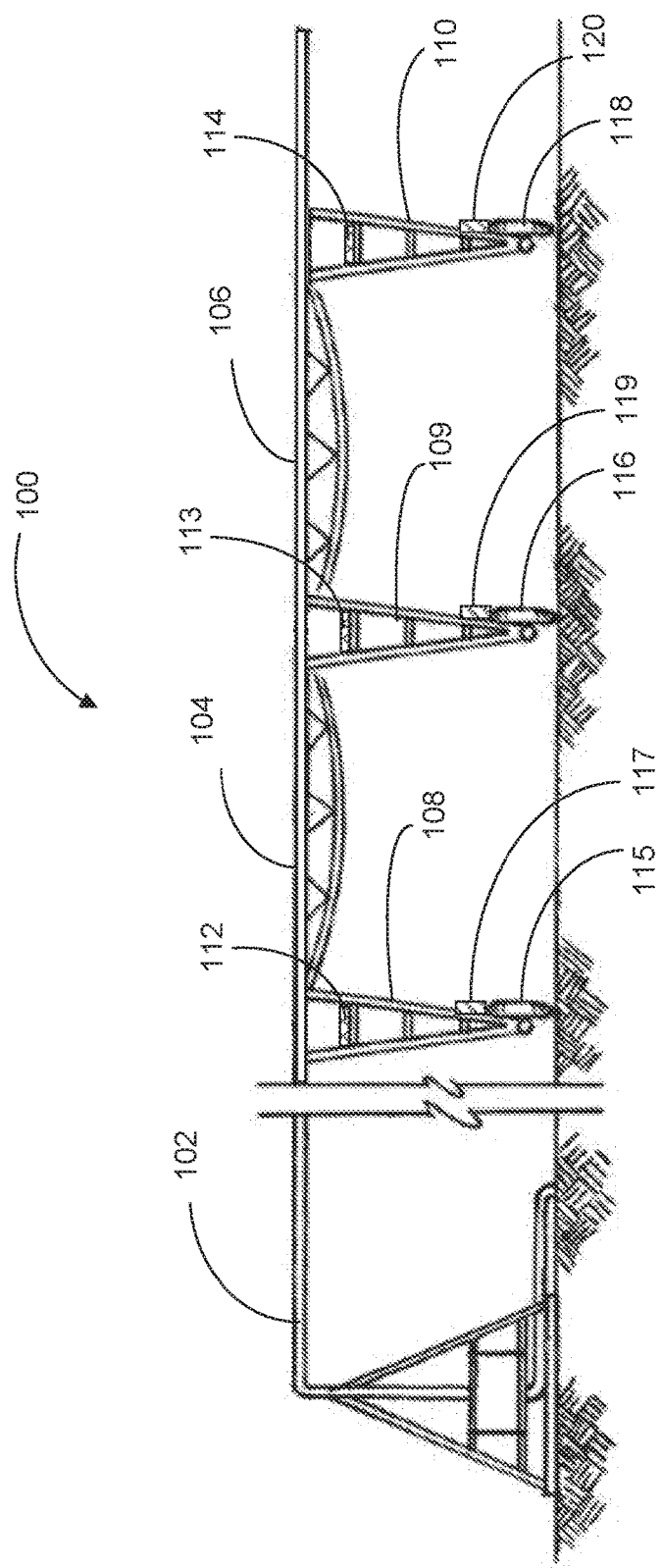
FIG. 1 shows an illustration of an exemplary irrigation machine in accordance with a first preferred embodiment of the present invention.

With reference now to FIG. 1, an exemplary irrigation machine 100 incorporating aspects of the present invention shall now be discussed. As should be understood, the irrigation system 100 disclosed in FIG. 1 is an exemplary irrigation system onto which the features of the present invention may be integrated. Accordingly, FIG. 1 is intended to be illustrative and any of a variety of alternative systems (i.e. fixed systems as well as linear and center pivot self-propelled irrigation systems; stationary systems; corner systems and/or bender type systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

With reference now to FIG. 1, spans 102, 104, 106 are shown supported by drive towers 108, 109, 110. Further, each drive tower 108, 109, 110 is shown with respective drive controllers 112, 113, 114. For each drive tower, 108, 109, 110, the respective drive controllers 112, 113, 114 preferably control respective drive motors 117, 119, 120 and drive wheels 115, 116, 118. According to alternative embodiments of the present invention, a single irrigation machine may use one or more drive towers in accordance with the present invention in combination with any of a variety of other types of drive towers (including unmotorized) without departing from the scope of the present invention.

Figure 2:
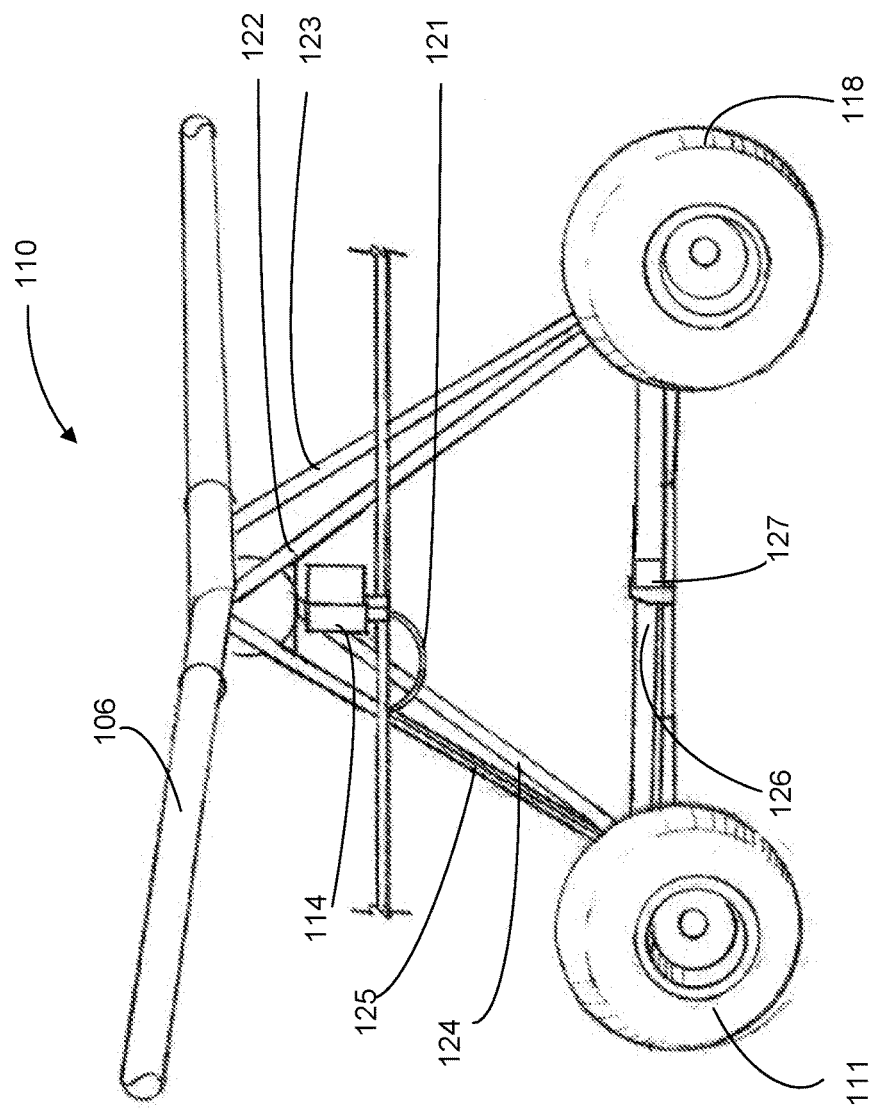
FIG. 2 shows a perspective view of an exemplary drive tower in accordance with a first preferred embodiment of the present invention.

With reference now to FIG. 2, an exemplary end drive tower 110 supporting a span 106 is further shown in more detail. As shown, the drive tower 110 includes a drive controller 114 which is electrically connected via a wire 121 (which includes one or more electrical lines for providing communications and power transmission) to a center drive motor 127. As further shown, the drive tower 110 is supported by drive wheels 111, 118, at least one of which is a drive wheel which receives torque from the center drive motor 127. As further shown, the drive tower is supported via cross member 126, left supporting legs 124, 125 and right supporting legs 122, 123.

Figure 3:
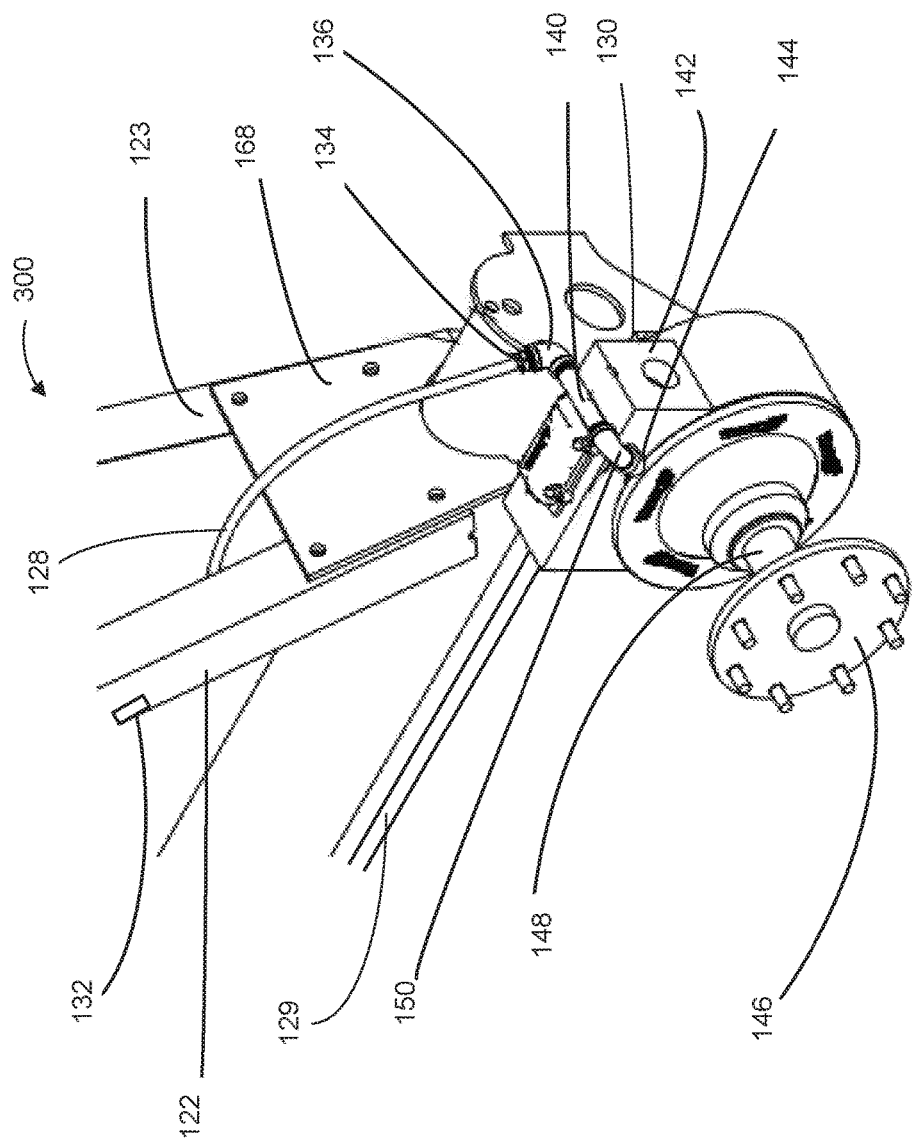
FIG. 3 shows an illustration of an exemplary arrangement of a remotely mounted gearbox breather for an irrigation machine in accordance with a further preferred embodiment of the present invention.

With reference now to FIG. 3, an illustration of an exemplary arrangement 300 of a remotely mounted gearbox breather in accordance with a further preferred embodiment of the present invention shall now be discussed. As shown in FIG. 3, the torque from the center drive motor 127 is preferably transferred to the wheel gearbox 142 via a drive shaft 129. Preferably, the gearbox output shaft 148 transmits the rotary motion of the wheel gearbox 142 to a wheel hub 146. The wheel gearbox 142 as shown is preferably connected via a beam 130 to a connecting plate 168 and secured to both the front, right supporting leg 122 and the rear, right supporting leg 123.

As further shown in FIG. 3, the gearbox 142 of the present invention is preferably fitted with a breather line 128 which is connected to the gearbox 142 at the gearbox fill port 144. According to a preferred embodiment, the breather line 128 is preferably ⅜" tubing which is secured to a hose barb 134 via a hose clamp (not shown) or the like. As shown, the breather line 128 is preferably connected to the gearbox fill port 144 via hose barb 134 which is preferably connected to a ½" elbow 136, a nipple/extension pipe 140, and a ½" street elbow 150. Preferably, the elbow 136 is preferably angled in the same direction as the supporting legs 122, 123 to prevent stress or kinking of the breather line 128. The breather line 128 preferably extends to connect with the breather assembly 400 (shown in FIG. 4) which is preferably secured to a supporting 122 via a snap clip 132 or other type of securing fastener.

Figure 4:
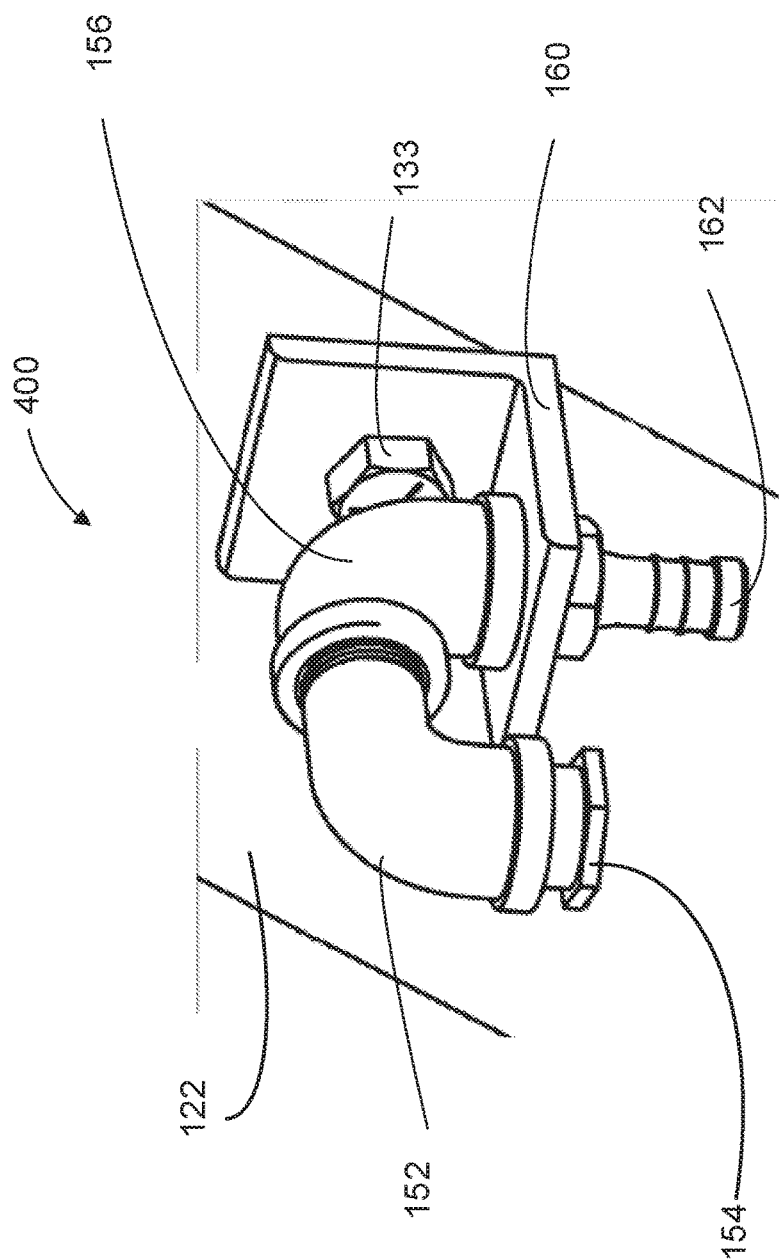
FIG. 4 shows a perspective view of the gearbox breather of FIG. 3.

With reference now to FIG. 4, a breather assembly 400 in accordance with a first aspect of the present invention will now be further discussed. As shown in FIG. 4, the breather assembly 400 may preferably include an angle mount 160 secured to the leg 122 via a ½" cap screw 133 extending through the leg 122 and secured with a lock nut (not shown). The breather outlet 154 is preferably secured onto the angle mount 160 via a ½" street elbow 152 connected to a ½" elbow 156 which is secured to hose barb 162 extending through the angle mount 160. The breather assembly 140 is preferably secured to the angle mount 160 via a hose barb 162. The breather outlet 154 preferably contains a breathable membrane that allows venting of gases but prevents liquids such as water from entering.

Figure 5:
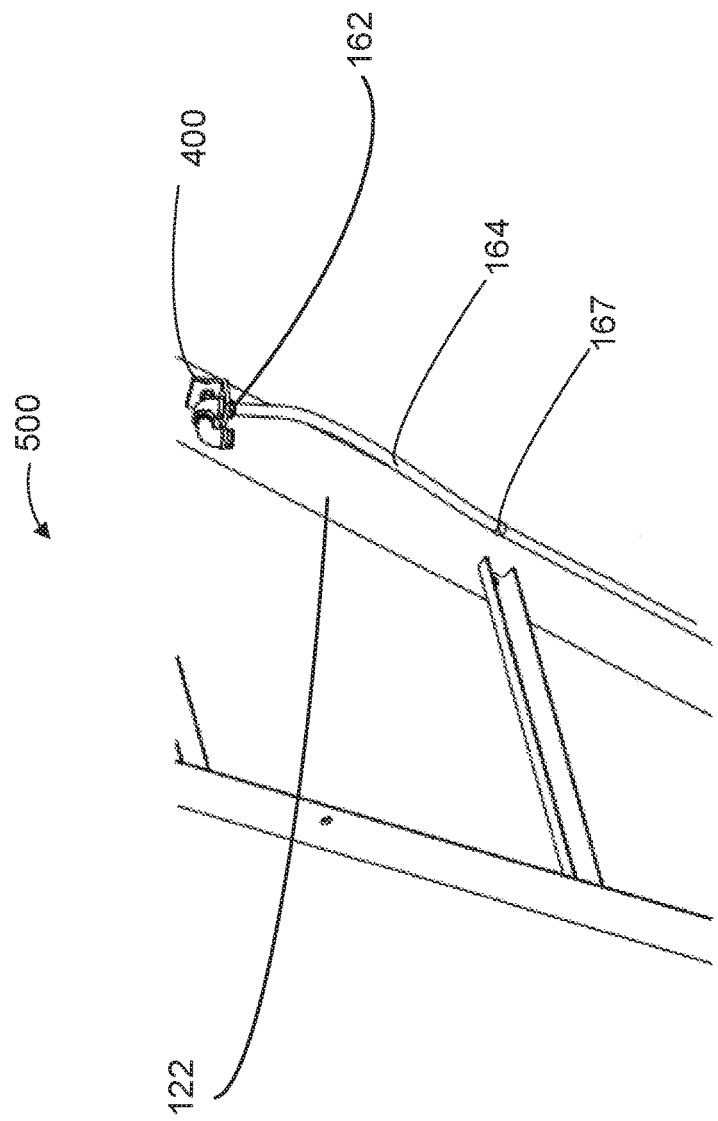
FIG. 5 shows a mounting configuration for the gearbox breather shown in FIG. 4.

With reference now to FIG. 5, a mounting configuration 500 for the gearbox breather shown in FIG. 4 is provided. As shown, the breather assembly 400 is preferably connected to the breather line 164 via hose barb 162 and secured with a hose clamp (not shown). In this preferred configuration, the breather line 164 preferably is secured to the leg 122 via one or more snap clips 167 to remove excess slack in the breather line 164 and to secure the breather line against snagging by crop as the irrigation tower traverses the field.

Properly applied, the present invention as described herein will preferably allow a wheel gearbox to vent freely to the atmosphere without contaminating the crops that are being irrigated and will help prevent other leak issues associated with the wheel gearbox. The present invention may further be used on a variety of gearbox arrangements.

For example, the present invention could be used on a center-drive gearbox, corner arm steerable drive unit steering gearbox or the like.

The scope of the present invention should be determined not by the embodiments illustrated, but by the appended claims and their legal equivalents.

What is claimed is:

1. In a mechanized system having at least one span and a drive tower having at least a first supporting leg, a second supporting leg, a drive motor, a drive shaft, and a gearbox having a gearbox fill port; a breather system, wherein the breather system comprises:
a breather line, wherein the breather line is comprised of a first end and a second end; wherein the first end of the breather line is connected to the gearbox at the gearbox fill port using a connection assembly;
wherein the connection assembly is comprised of:
a first elbow; wherein the first elbow is connected at a first side to the gearbox;
a first pipe extension; wherein the first elbow is connected at a second side to the first pipe extension;
a second elbow, wherein the second elbow is angled in the same direction as the first supporting leg; wherein the second elbow is connected at a first side to the first pipe extension; and
a first hose barb, wherein the first hose barb is connected on a second side of the second elbow; further wherein the hose barb is connected to the first end of the breather line;
a breather assembly, wherein the breather assembly is comprised of:
an angle mount, wherein the angle mount is secured to the first supporting leg; wherein the angle mount comprises a first surface and a second surface; wherein the second surface is secured to the first supporting leg; and
a breather outlet, wherein the breather outlet is secured to the angle mount by a breather connection assembly;
wherein the breather connection assembly comprises:
a third elbow; wherein the third elbow is connected on a first side to the breather outlet;
a fourth elbow, wherein the fourth elbow is connected on a first side to the third elbow; wherein the fourth elbow is connected on a second side to the first surface; and
a second hose barb; wherein the hose barb is connected at a first end to the first surface of the angle amount; wherein the second hose barb is connected at a second end to the breather line.

2. The system of claim 1, wherein the breather assembly is located at a point higher than an oil level of the gearbox.

3. The system of claim 1, wherein the breather assembly is oriented downward.

4. The system of claim 1, wherein the breather line is secured to the first supporting leg using at least one snap clip.

5. The system of claim 1, wherein the first elbow is a street elbow.

6. The system of claim 5, wherein the third elbow is a street elbow.

7. The system of claim 6, wherein the first surface of the angle mount is substantially orthogonal to the second surface of the angle mount.

* * * * *